Oct. 4, 1932.   W. L. R. EMMET   1,880,938
APPARATUS FOR UTILIZING SOLAR HEAT
Filed Aug. 19, 1929

Inventor
William L. R. Emmet,
By
Attorneys

Patented Oct. 4, 1932

1,880,938

UNITED STATES PATENT OFFICE

WILLIAM L. R. EMMET, OF SCHENECTADY, NEW YORK, ASSIGNOR TO CHARLES G. ABBOT, OF WASHINGTON, DISTRICT OF COLUMBIA

APPARATUS FOR UTILIZING SOLAR HEAT

Application filed August 19, 1929. Serial No. 386,899.

This invention relates to apparatus for absorbing the heat of solar radiation and for rendering it useful for various purposes, such as heating liquids for domestic, power or warming purposes, or for purposes of evaporation.

While many attempts have been made to provide an apparatus of the character named they have been inefficient, due to the failure of the designers thereof to recognize certain conditions which are necessary to the satisfactory utilization of such radiation. The amount of heat per unit area contained in the solar radiation is, under the best conditions, relatively small, and to obtain a substantial rise in temperatures from it, necessitates the use of every refinement possible to reduce radiation and convection losses, while economic reasons demand the simplest and most inexpensive construction.

It has been heretofore proposed (see my prior Patent No. 980,505) to utilize as heat receiving elements a series of boiler tubes, each contained in an evacuated glass container exposed to the rays of the sun and to reflect to a linear focus on the several tubes, such rays by means of mirrors exterior to the container, the tubes being arranged in banks between suitable headers. This arrangement has certain disadvantages, among them being the deterioration of the mirror surface under the influences of the atmosphere, the loss of heat due to multiple reflection before reaching the heater tube, and a certain complexity of parts. I propose to avoid these objections by placing the reflecting surface interiorly of the evacuated container, whereby deterioration will be prevented, simplicity promoted, and whereby such losses will be reduced to a minimum.

The apparatus herein described has been designed by me with the above points in view and my invention consists in the construction, arrangement and combination of the parts of which it is composed, as will be hereinafter more fully described and claimed.

Referring to the accompanying drawing in which corresponding parts are designated by corresponding marks of reference,—

Figure 1:
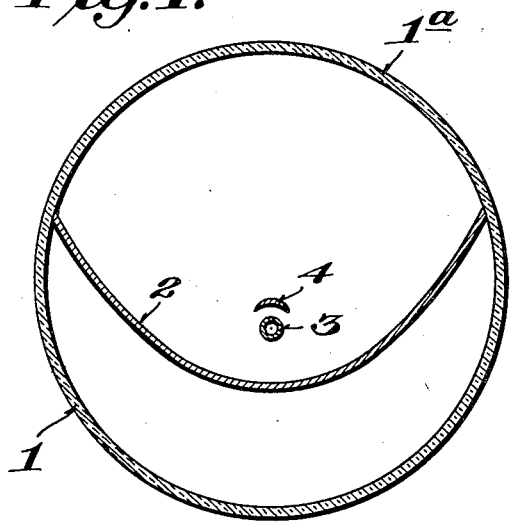
Figure 1 is a transverse section through a heating element (i. e., a boiler tube and an enclosed evacuated container) embodying my invention.
Figure 2:
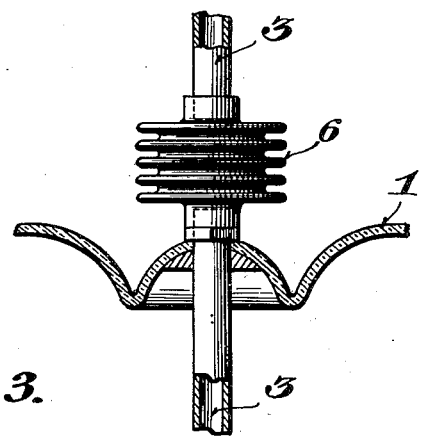
Figure 2 is a fragmental longitudinal section through an element embodying another feature of my invention.
Figure 3:
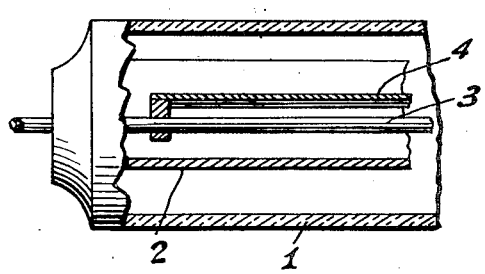
Figure 3 is a fragmental longitudinal section through a heating element on a smaller scale than Figure 1.

Referring to Figure 1, the evacuated glass container is shown at 1. As there represented it is circular in cross section and has within it a metallic mirror 2 extending the length of the container and approximately parabolic in transverse section. Likewise extending lengthwise of the container is a boiler tube 3 located in front of and at the focal line of the mirror, so that rays from the sun falling on and passing through the anterior part $1^a$ of the container will, after reflection from the mirror, be concentrated on the boiler tube. As the heat absorbing elements of the system (the boiler tube and to a less extent the mirror) are both contained in the evacuated container, conduction and convection losses therefrom will be minimized. As it is desirable that the boiler tube be of relatively small diameter, and as a certain amount of dispersion may exist in the reflected rays, I have shown, mounted on the tube and in front of the same, a metallic reflector 4 concaved on its posterior surface to reflect the rays passing adjacent to but not impinging on the tube, back on the tube. Long wave rays emitted by the heater tube will also be hindered from escaping towards the front by said reflector, so that the temperature of the boiler tube will be thus enhanced.

The boiler tubes are preferably metallic, and as the elements above described are preferably of considerable length and as the tubes pass through and are sealed in the ends of the container, the difference in the expansion of the metallic tubes and of the glass containers may cause breakage. To prevent this a metallic accordion coupling 6 is associated with each tube to permit the expansion of the metal without creating undue strain on the container.

Having thus described my invention what

I claim as new and desire to secure by U. S. Letters Patent is:—

1. A solar heating element comprising an elongated evacuated glass container, an elongated converging mirror within said container, a boiler tube located in front of and at the linear focus of the mirror, and a second mirror mounted on the tube and in front thereof.

2. A device for utilizing solar energy, comprising an evacuated hollow member having its anterior wall transparent to solar rays, a reflector contained within the posterior portion of said hollow member and a ray-absorbing element situated within said hollow member in the focus of said reflector.

3. A solar heating element comprising an elongated evacuated glass container, an elongated converging mirror within the container, and a metallic boiler tube located in front of and at the linear focus of the mirror, said boiler tube being hermetically sealed within the container.

In testimony whereof I hereunto affix my signature.

WILLIAM L. R. EMMET.